(12) United States Patent
Park et al.

(10) Patent No.: US 7,934,910 B2
(45) Date of Patent: May 3, 2011

(54) PISTON DISPLACEMENT DEVICE FOR RECIPROCATING COMPRESSOR

(75) Inventors: Kyeong-Bae Park, Seoul (KR); Ki-Chul Choi, Seoul (KR); Eon-Pyo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 752 days.

(21) Appl. No.: 11/225,205

(22) Filed: Sep. 14, 2005

(65) Prior Publication Data

US 2006/0127250 A1   Jun. 15, 2006

(30) Foreign Application Priority Data

Dec. 10, 2004 (KR) .................. 10-2004-0104418

(51) Int. Cl.
*F04B 17/04* (2006.01)
(52) U.S. Cl. .......................................... 417/417
(58) Field of Classification Search .......... 417/417, 417/902, 363; 92/178; 310/15; 318/119
See application file for complete search history.

(56) References Cited

U.S. PATENT DOCUMENTS

| | | | | |
|---|---|---|---|---|
| 3,790,833 A | * | 2/1974 | Hasebe | 310/162 |
| 5,537,820 A | * | 7/1996 | Beale et al. | 60/517 |
| 5,632,606 A | * | 5/1997 | Jacobsen et al. | 417/415 |
| 5,752,811 A | * | 5/1998 | Petro | 417/416 |
| 5,897,296 A | * | 4/1999 | Yamamoto et al. | 417/44.1 |
| 5,993,178 A | * | 11/1999 | Park et al. | 417/545 |
| 6,301,912 B1 | * | 10/2001 | Terai et al. | 62/228.4 |
| 6,435,842 B2 | * | 8/2002 | Song | 417/363 |
| 6,485,271 B1 | * | 11/2002 | Tack | 417/363 |
| 6,491,506 B1 | * | 12/2002 | Oh et al. | 417/417 |
| 6,632,076 B2 | * | 10/2003 | Morita et al. | 417/417 |
| 6,676,388 B2 | * | 1/2004 | Lee et al. | 417/417 |
| 6,793,470 B2 | * | 9/2004 | Song et al. | 417/417 |
| 6,863,506 B2 | * | 3/2005 | Park et al. | 417/360 |
| 7,316,547 B2 | * | 1/2008 | Lilie | 417/416 |
| 7,331,772 B2 | * | 2/2008 | Jung et al. | 417/417 |
| 2002/0157624 A1 | * | 10/2002 | Janak | 123/90.12 |
| 2003/0035743 A1 | * | 2/2003 | Lee et al. | 417/417 |
| 2003/0170128 A1 | * | 9/2003 | Song et al. | 417/363 |

FOREIGN PATENT DOCUMENTS

KR   10-2004-0078527 A   9/2004
KR   2004085425   * 10/2004

* cited by examiner

*Primary Examiner* — Devon C Kramer
*Assistant Examiner* — Amene S Bayou
(74) *Attorney, Agent, or Firm* — Birch, Stewart, Kolasch & Birch, LLP

(57) ABSTRACT

A piston displacement device for a reciprocating compressor comprises a piston linearly reciprocated in a cylinder and having a stroke length varied by a reciprocating motor, a plurality of resonance springs for guiding a resonant motion of the piston, and a piston transfer unit for moving the piston forward or backward in a motion direction of the piston according to a capacitance variation of a compressor and thereby maintaining the same top dead center. The piston is moved according to a capacitance variation of the compressor thereby to minimize a dead volume thereof and to increase the efficiency of the compressor.

10 Claims, 5 Drawing Sheets

PISTON DISPLACEMENT DEVICE FOR RECIPROCATING COMPRESSOR

BACKGROUND OF THE INVENTION

1. Field of the Invention

The present invention relates to a reciprocating compressor, and more particularly, to a piston displacement device for a reciprocating compressor capable of minimizing a dead volume by moving a piston according to a capacitance variation of a compressor and thereby increasing an efficiency of the compressor.

2. Description of the Conventional Art

Generally, a reciprocating compressor is a device for sucking gas, compressing, and discharging the gas as a piston is linearly reciprocated in a cylinder. FIG. 1 is a sectional view showing an example of a reciprocating compressor in accordance with the conventional art.

As shown, the conventional reciprocating compressor comprises a casing 10 having a gas suction pipe SP and a gas discharge pipe DP, a frame unit 20 elastically supported in the casing 10, a reciprocating motor 30 supported by the frame unit 20 and fixed in the casing 10, a compression unit 40 for sucking and compressing refrigerant gas while a piston 42 is linearly reciprocated with a mover 33 of the reciprocating motor 30, and a resonance spring unit 50 for inducing a resonance by elastically supporting the reciprocating motor 30.

The frame unit 20 includes a front frame 21 for supporting each one side of an outer stator 31 and an inner stator 32 of the reciprocating motor 30 and for supporting a cylinder 41 and the piston 42 of the compression unit 40, a middle frame 22 coupled to the front frame 21 under a state that the reciprocating motor 30 is interposed therebetween for supporting the outer stator 31 of the reciprocating motor 30, and a rear frame 23 coupled to the middle frame 22 for supporting the resonance spring unit 50.

The reciprocating motor 30 includes the outer stator 31 having a winding coil C and fixed between the front frame 21 and the middle frame 22, the inner stator 32 positioned at an inner side of the outer stator 31 and fixed to the cylinder 41 of the compression unit 40, and the mover 33 having a magnet M and linearly reciprocated between the outer stator 31 and the inner stator 32 along a flux direction.

The compression unit 40 includes the cylinder 41 insertion-coupled to the front frame 21, the piston 42 coupled to the mover 33 of the reciprocating motor 30 and reciprocated in the cylinder 41 for sucking and compressing refrigerant gas through a gas channel F, a suction valve 43 mounted at an end of the cylinder 41 for opening and closing the gas channel F, a discharge valve 44 detachably installed at an end of the cylinder 41 for limiting the discharge of compression gas, a valve spring 45 for elastically supporting the discharge valve 44, and a discharge cover 46 having the discharge valve 44 and the valve spring 45 therein and fixed to the front frame 21 with the cylinder 41.

The resonance spring unit 50 includes a spring supporting unit 51 coupled to a connection part between the mover 33 and the piston 42, a plurality of front resonance springs 52 for supporting the front side of the spring supporting unit 51, and a plurality of rear resonance springs 53 for supporting the rear side of the spring supporting unit 51.

An unexplained reference numeral P denotes a compression chamber.

An operation of the conventional reciprocating compressor will be explained as follows.

When power is applied to the outer stator 31 of the reciprocating motor 30, a flux is generated between the outer stator 31 and the inner stator 32 and thereby the mover 33 and the piston 42 move in the flux direction. Accordingly, the piston 42 is linearly reciprocated in the cylinder 41 by the spring unit 50 and generates a pressure difference in the compression chamber P of the cylinder 41, thereby sucking refrigerant gas into the compression chamber P, compressing the gas into a certain pressure, and discharging the gas. The processes for sucking, compressing, and discharging the gas are repeated.

In order to control a cooling capacity of the compressor according to a load condition of a refrigerating cycle, an amount of current supplied to the winding coil C is controlled so as to control a stroke length of the piston 42. Accordingly, a suction amount of refrigerant gas is increase or decreased so as to control the cooling capacity according to the load.

However, in the conventional reciprocating compressor, as shown in FIGS. 2 and 3, as the stroke length of the piston 42 is varied, a top dead center (TDC) is spaced from the discharge valve 44 thereby to increase a dead volume. Especially, in case of shortening the stroke length by reducing the amount of current supplied to the winding coil C in order to decrease the cooling capacity of the compressor, the top dead center of the piston 42 is more spaced from the discharge valve 44 thereby to lower the efficiency of the compressor.

SUMMARY OF THE INVENTION

Therefore, an object of the present invention is to provide a piston displacement device for a reciprocating compressor capable of minimizing a dead volume by moving a piston according to a capacitance variation of a compressor and thereby increasing an efficiency of the compressor.

To achieve these and other advantages and in accordance with the purpose of the present invention, as embodied and broadly described herein, there is provided a piston displacement device for a reciprocating compressor comprising: a piston linearly reciprocated in a cylinder and having a stroke length varied by a reciprocating motor; a plurality of resonance springs for guiding a resonant motion of the piston; and a piston transfer unit for moving the piston forward or backward in a motion direction of the piston according to a capacitance variation of a compressor and thereby maintaining the same top dead center.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a piston displacement device of a reciprocating compressor according to the present invention will be explained with reference to the attached drawings in more detail.

Figure 1:
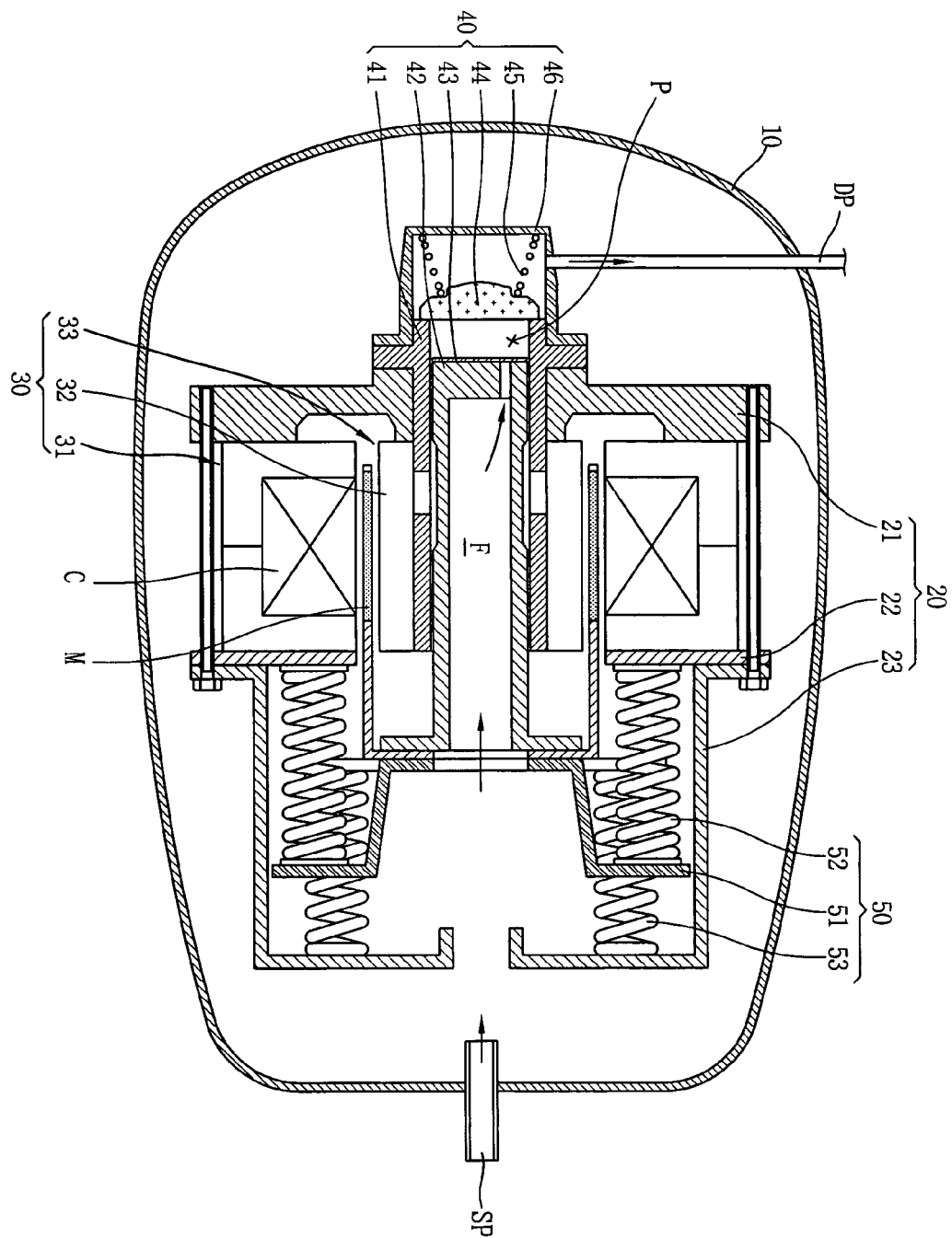
FIG. 1 is a sectional view showing an example of a reciprocating compressor in accordance with the conventional art.
Figure 2:
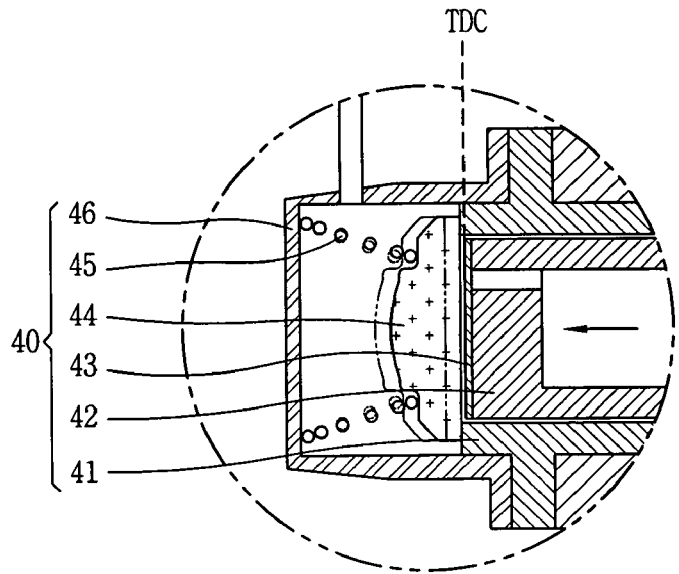
FIG. 2 is a sectional view showing that a stroke of a piston is maximum in the reciprocating compressor in accordance with the conventional art.
Figure 3:
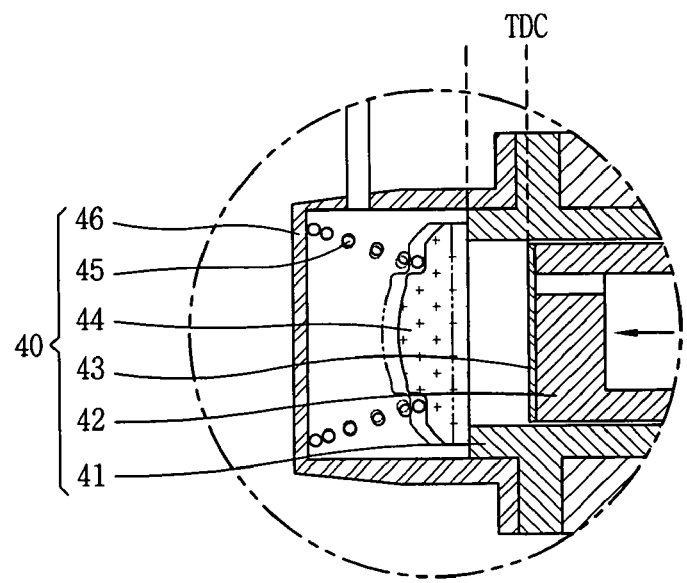
FIG. 3 is a sectional view showing that the stroke of the piston is minimum in the reciprocating compressor in accordance with the conventional art.
Figure 4:
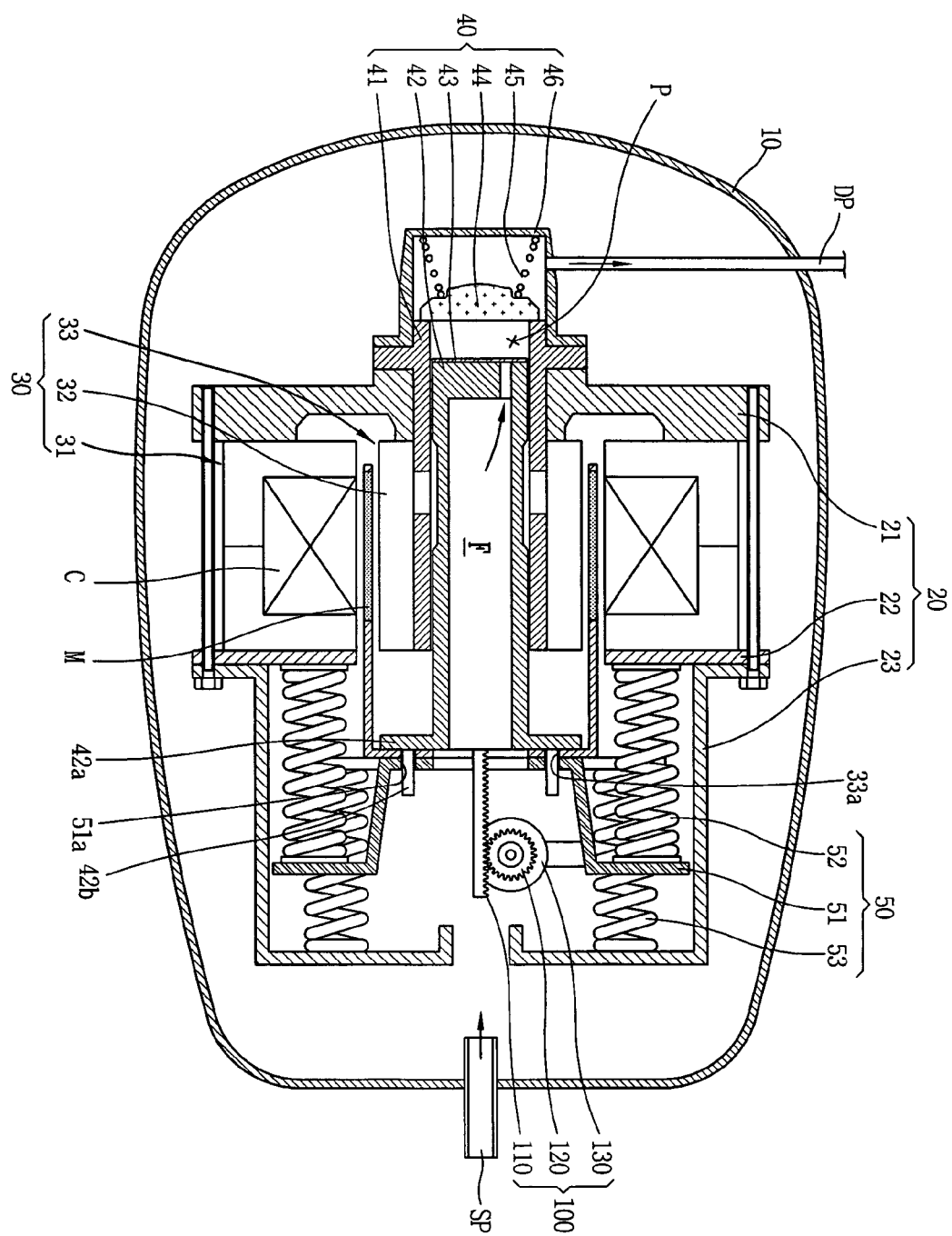
FIG. 4 is a sectional view showing that a stroke of a piston is maximum in a reciprocating compressor according to the present invention.
Figure 5:
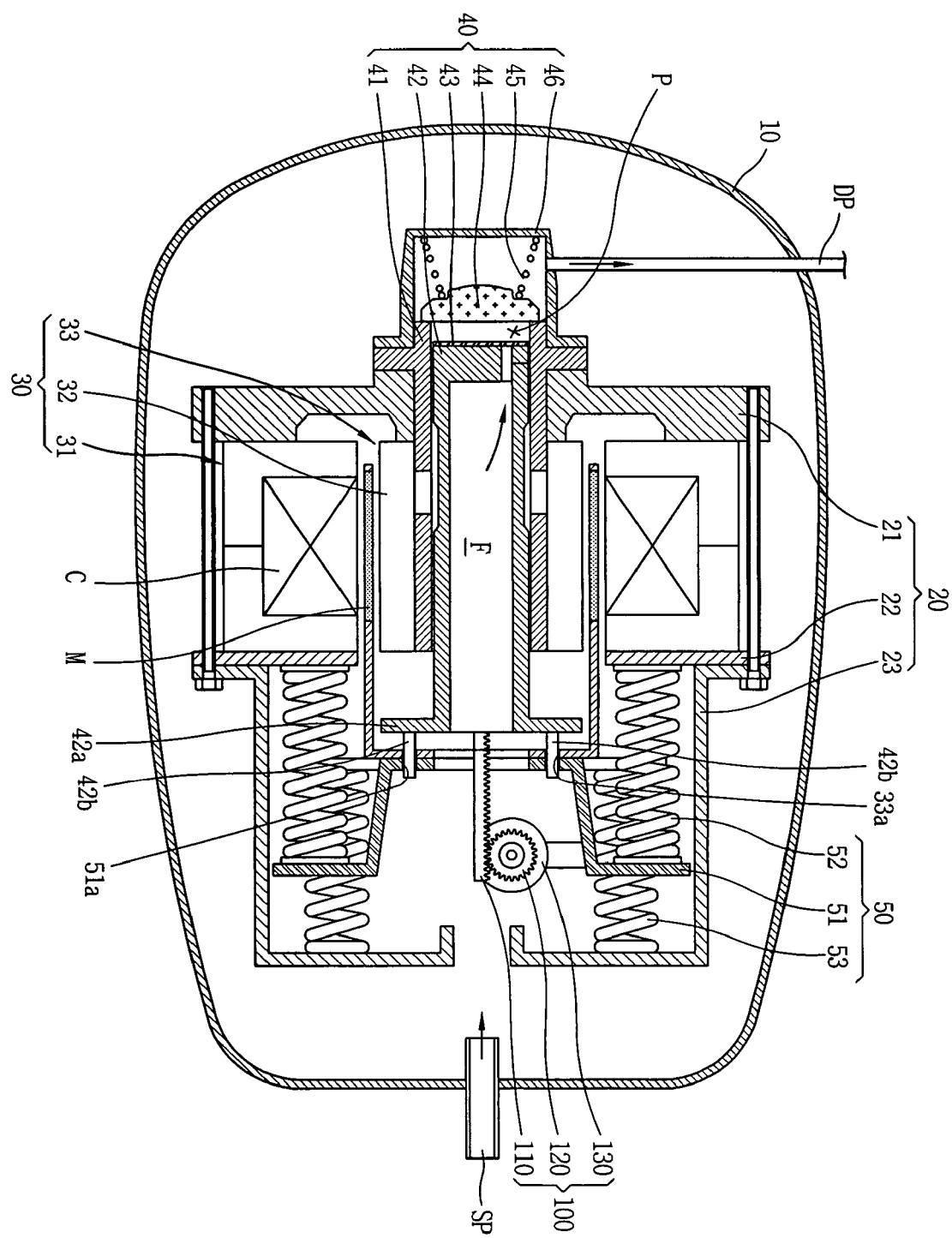
FIG. 5 is a sectional view showing that the stroke of the piston is minimum in the reciprocating compressor according to the present invention.

FIG. 4 is a sectional view showing that a stroke of a piston is maximum in a reciprocating compressor according to the present invention, and FIG. 5 is a sectional view showing that the stroke of the piston is minimum in the reciprocating compressor according to the present invention.

As shown, the reciprocating compressor according to the present invention comprises a casing 10 having a gas suction pipe SP and a gas discharge pipe DP, a frame unit 20 elastically supported in the casing 10, a reciprocating motor 30 supported by the frame unit 20 and fixed in the casing 10, a compression unit 40 having a piston 42 and for sucking and compressing refrigerant gas while the piston 42 is linearly reciprocated with a mover 33 of the reciprocating motor 30, and a piston displacement device for moving the piston 42 according to a capacitance variation of the compressor and thereby maintaining the same top dead center.

The frame unit 20 includes a front frame 21 for supporting one side of an outer stator 31 of the reciprocating motor 30, a middle frame 22 coupled to the front frame 21 under a state that the reciprocating motor 30 is interposed therebetween for supporting the outer stator 31 of the reciprocating motor 30, and a rear frame 23 coupled to the middle frame 22 for supporting a resonance spring unit 50.

The reciprocating motor 30 includes the outer stator 31 having a winding coil C and fixed between the front frame 21 and the middle frame 22, an inner stator 32 insertion-fixed to the cylinder 41 of the compression unit 40 so as to be positioned at an inner side of the outer stator 31 and linearly reciprocated in a flux direction, and the mover 33 having a magnet M and linearly reciprocated between the outer stator 31 and the inner stator 32 in the flux direction.

The compression unit 40 includes the cylinder 41 insertion-coupled to the inner stator 32, the piston 42 slidably inserted into the cylinder 41 for sucking a refrigerant through a gas channel F and compressing the refrigerant, a suction valve 43 mounted at an end of the cylinder 41 for opening and closing the gas channel F, a discharge valve 44 detachably installed at an end of the cylinder 41 so as to be inserted into a certain depth for limiting the discharge of compression gas, a valve spring 45 for elastically supporting the discharge valve 44, and a discharge cover 46 having the discharge valve 44 and the valve spring 45 therein and fixed to the front frame 21 with the cylinder 41.

The piston displacement device for a reciprocating compressor includes a piston 42 linearly reciprocated in the cylinder 41 and having a stroke length varied by the reciprocating motor 30, a plurality of resonance springs 52 for guiding a resonant motion of the piston 42, and a piston transfer unit 100 for moving the piston 42 forward or backward in a motion direction of the piston according to a capacitance variation of a compressor and thereby maintaining the same top dead center.

The piston 42 is provided with the gas channel F therein, and a first gear 110 is fixedly coupled to a rear side of the gas channel F. Also, a flange portion 42a is formed at an outer circumferential surface of the rear side of the piston 42 so as to be detachably fixed to the mover 33 or a spring supporting unit 51.

A plurality of guide bars 42b slidably coupled to the mover 33 or the spring supporting unit 51 are formed at the rear surface of the flange portion 42a in a circumferential direction so that the piston 42 can be supported at the mover 33 or the spring supporting unit 51 in a radial direction at the time of performing a reciprocation.

The piston transfer unit 100 includes a first gear 110 formed as a rack gear fixed to a rear end of the piston 42, a second gear 120 rotated with being engaged to the first gear 110 and formed as a pinion gear for transferring the first gear 110 with the piston 42 in an axial direction, and a piston transfer motor 130 connected to the second gear 120 for driving the second gear 120.

The piston transfer motor 130 is a driving source separately installed from the reciprocating motor 30, and is preferably provided with a controller (not shown) so as to automatically correspond to a variation of a stroke of the piston 42 according to a capacitance variation of the compressor.

The piston transfer motor 130 is preferably fixed to the spring supporting unit 51.

Even if the piston transfer unit 100 is constructed to have the gears in the present invention, the piston transfer unit 100 may be formed as a pneumatic device or a hydraulic device.

The piston transfer unit 100 can directly vary the position of the piston by using an ultrasonic motor without a power transmitting device such as the gear.

The resonance spring unit 50 includes a spring supporting unit 51 fixed to the mover 33 and detachably fixed to the piston 42, a plurality of front resonance spring springs 52 for supporting the front side of the spring supporting unit 51, and a plurality of rear resonance spring springs 53 for supporting the rear side of the spring supporting unit 51.

As aforementioned, the spring supporting unit 51 is arranged to be adhered to the piston 42 or to be spaced from the piston 42 according to the initial position of the piston 42. For example, when the piston 42 moves with a maximum stroke for a large cooling capacity, as shown in FIG. 4, the spring supporting unit 51 is adhered to the piston 42. However, when a small cooling capacity is required, as shown in FIG. 5, the piston 42 is spaced from the spring supporting unit 51. The spring supporting unit 51 fixes the piston transfer motor 130 to a flange portion (not shown) formed at the center thereof, and is provided with a plurality of guide holes 51a for slidably coupling the guide bars 42b of the piston 42 in a circumferential direction.

An unexplained reference numeral 33a denotes a guide hole.

Effects of the present invention will be explained as follows.

Figure 6:
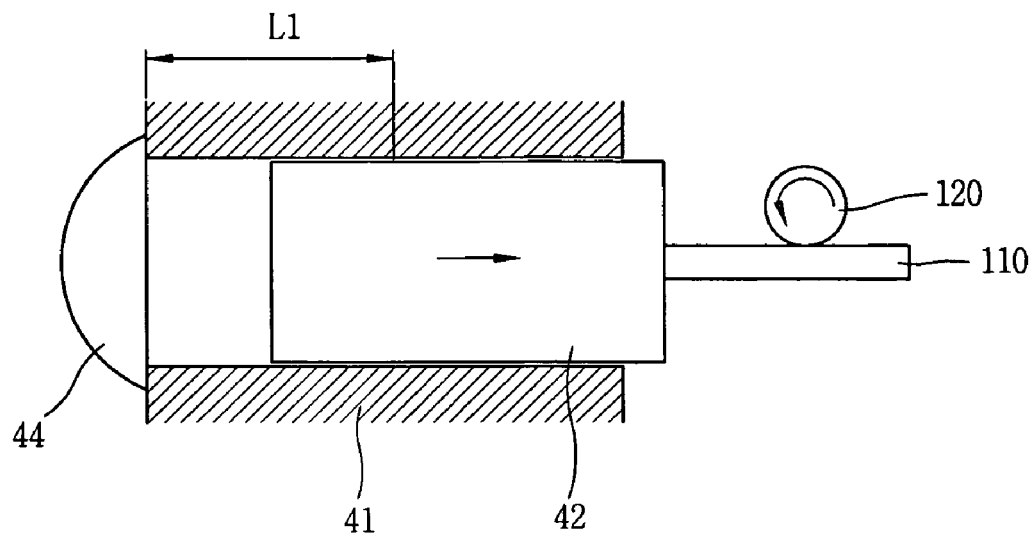
FIGS. 6 and 7 are sectional views showing a variation of the stroke of the piston according to a capacitance variation in the reciprocating compressor of the present invention.
Figure 7:
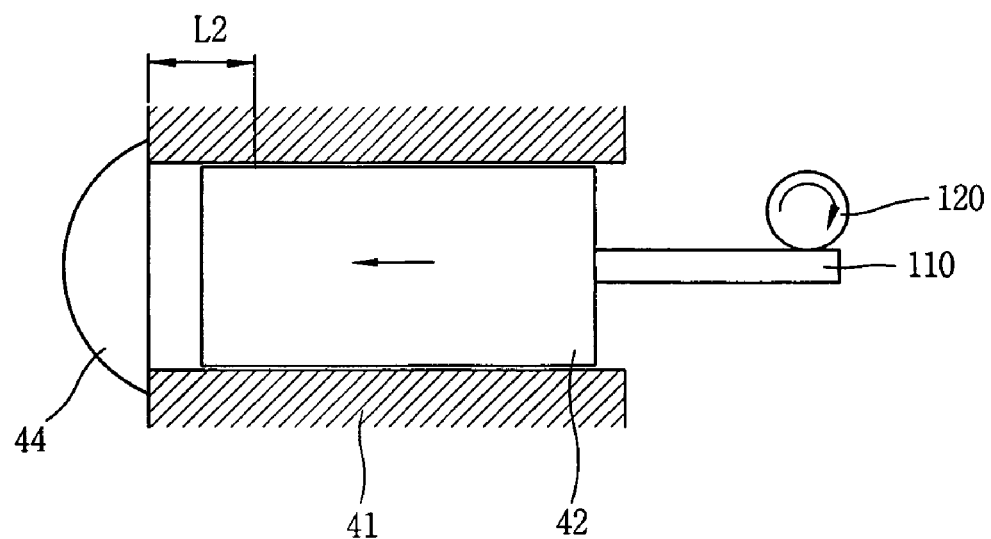

FIGS. 6 and 7 are sectional views showing a variation of the stroke of the piston according to a capacitance variation in the reciprocating compressor of the present invention.

When power is applied to the winding coil C of the outer stator 31 of the reciprocating motor 30, a flux is generated between the outer stator 31 and the inner stator 32 and thereby the mover 33 and the piston 42 move in the flux direction. At the same time, the piston 42 is linearly reciprocated in the cylinder 41 by the spring unit 50 and generates a pressure difference in a compression chamber P of the cylinder 41, thereby sucking refrigerant gas into the compression chamber P, compressing the gas into a certain pressure, and discharging the gas. The processes for sucking, compressing, and discharging the gas are repeated.

As shown in FIG. 6, when a stroke length of the piston 42 is 100%, the second gear 120 is counterclockwise rotated by the piston transfer motor 130 and the first gear 110 moves backward to the right side of the drawing. That is, the piston 42 to which the first gear 110 is coupled moves towards the rear side of the cylinder 41. Accordingly, the piston performs a motion with an increased stroke length L1 as shown in FIG. 4, thereby supplying a maximum cooling capacity.

On the contrary, when the cooling capacity of the compressor needs to be lowered according to a load variation of a refrigerating cycle, the second gear 120 is clockwise rotated by the piston transfer motor 130 and the first gear 110 moves forward to the left side of the drawing. That is, the piston 42 to which the first gear 110 is coupled moves towards the front side of the cylinder 41 as shown in FIG. 5. Accordingly, even if the stroke length L2 of the piston is decreased into approximately 50%, the top dead center is equally maintained to equally maintain a volume of the compression chamber versus a suction amount of refrigerant gas, thereby preventing the efficiency of the compressor from being lowered.

As aforementioned, in the piston displacement device for a reciprocating compressor according to the present invention, the piston is moved in an axial direction according to a capacitance variation of the compressor so as to maintain the same top dead center. Accordingly, even when the compressor is driven with a low capacitance, the piston is compressed up to the periphery of the discharge valve thereby to decrease the dead volume thereof and thus to prevent the efficiency of the compressor from being lowered.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A piston displacement device for a reciprocating compressor, comprising:
   a piston linearly reciprocated in a cylinder and having a stroke length varied by a reciprocating motor;
   a spring supporting unit located beneath the piston;
   a plurality of resonance springs bearing against the spring supporting unit; and
   a piston transfer unit for moving the piston forward or backward relative to the spring supporting unit according to a capacitance variation of a compressor and thereby maintaining the same top dead center,
   wherein one of the piston and the spring supporting unit is provided with a plurality of guide holes along a circumferential direction, and a plurality of guide bars are formed in the other of the piston and spring supporting unit, wherein the guide bars are inserted in the guide holes and are made to move therein, and
   wherein the piston adheres to the spring supporting unit when the piston transfer unit is set for maximum stroke and the piston is spaced from the spring supporting unit when the piston transfer unit is set for small cooling capacity.

2. A piston displacement device for a reciprocating compressor, comprising:
   a piston linearly reciprocated in a cylinder and having a stroke length varied by a reciprocating motor;
   a spring supporting unit located beneath the piston;
   a plurality of resonance springs; and
   a piston transfer unit for moving the piston relative to the spring supporting unit and thereby maintaining the same top dead center, the piston adhering to the spring supporting unit when the piston transfer unit is set for maximum stroke and the piston is spaced from the spring supporting unit when the piston transfer unit is set for small cooling capacity,
   wherein one of the piston and the spring supporting unit is provided with a plurality of guide holes along a circumferential direction, and a plurality of guide bars are formed in the other of the piston and spring supporting unit wherein the guide bars are inserted in the guide holes and are made to move therein.

3. The device of claim 2, wherein the piston transfer unit comprises:
   a first gear fixed to a rear end of the piston;
   a second gear rotated with being engaged to the first gear for transferring the first gear with the piston in an axial direction; and
   a piston transfer motor connected to the second gear for driving the second gear.

4. The device of claim 3, wherein the first gear is a rack gear and the second gear is a pinion gear.

5. The device of claim 2, wherein the piston transfer unit is a pneumatic unit.

6. The device of claim 2, wherein the piston transfer unit is a hydraulic unit.

7. The device of claim 2, wherein the piston transfer unit is an ultrasonic motor.

8. The device of claim 1, wherein the piston transfer unit is a pneumatic unit.

9. The device of claim 1, wherein the piston transfer unit is a hydraulic unit.

10. The device of claim 1, wherein the piston transfer unit is an ultrasonic motor.

* * * * *